July 13, 1948.  R. E. JASPERSON  2,444,933
AUTOMATIC NAVIGATIONAL DIRECTOR
Filed Aug. 7, 1946  9 Sheets-Sheet 1

Inventor
Robert E. Jasperson

Inventor
Robert E. Jasperson

July 13, 1948.    R. E. JASPERSON    2,444,933
AUTOMATIC NAVIGATIONAL DIRECTOR
Filed Aug. 7, 1946    9 Sheets-Sheet 3
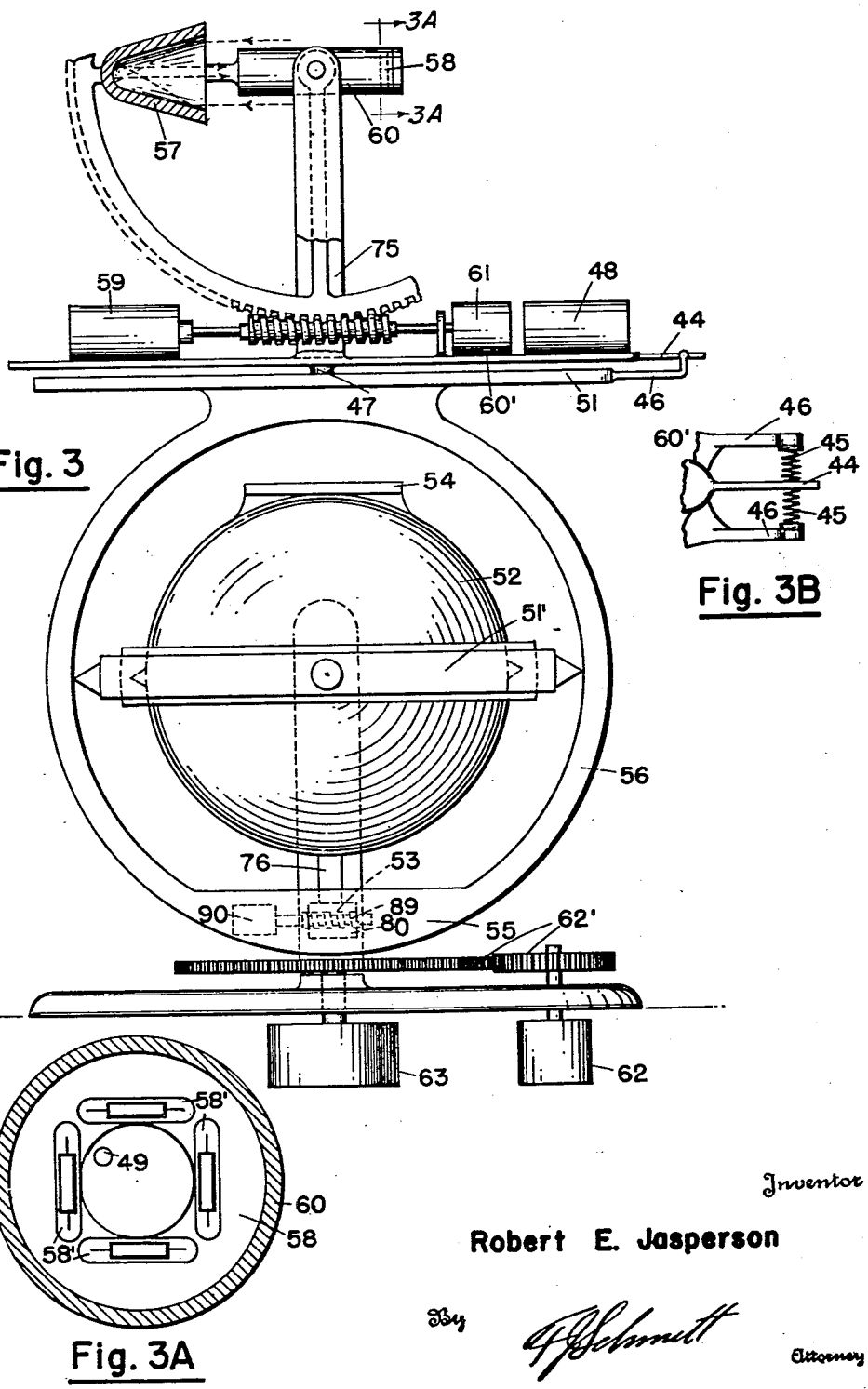
Inventor
Robert E. Jasperson
By  /s/ Schmitt
    Attorney July 13, 1948.   R. E. JASPERSON   2,444,933
AUTOMATIC NAVIGATIONAL DIRECTOR
Filed Aug. 7, 1946   9 Sheets-Sheet 4

Inventor
Robert E. Jasperson

By F. J. Schmutt
Attorney

July 13, 1948. R. E. JASPERSON 2,444,933
AUTOMATIC NAVIGATIONAL DIRECTOR
Filed Aug. 7, 1946 9 Sheets-Sheet 5
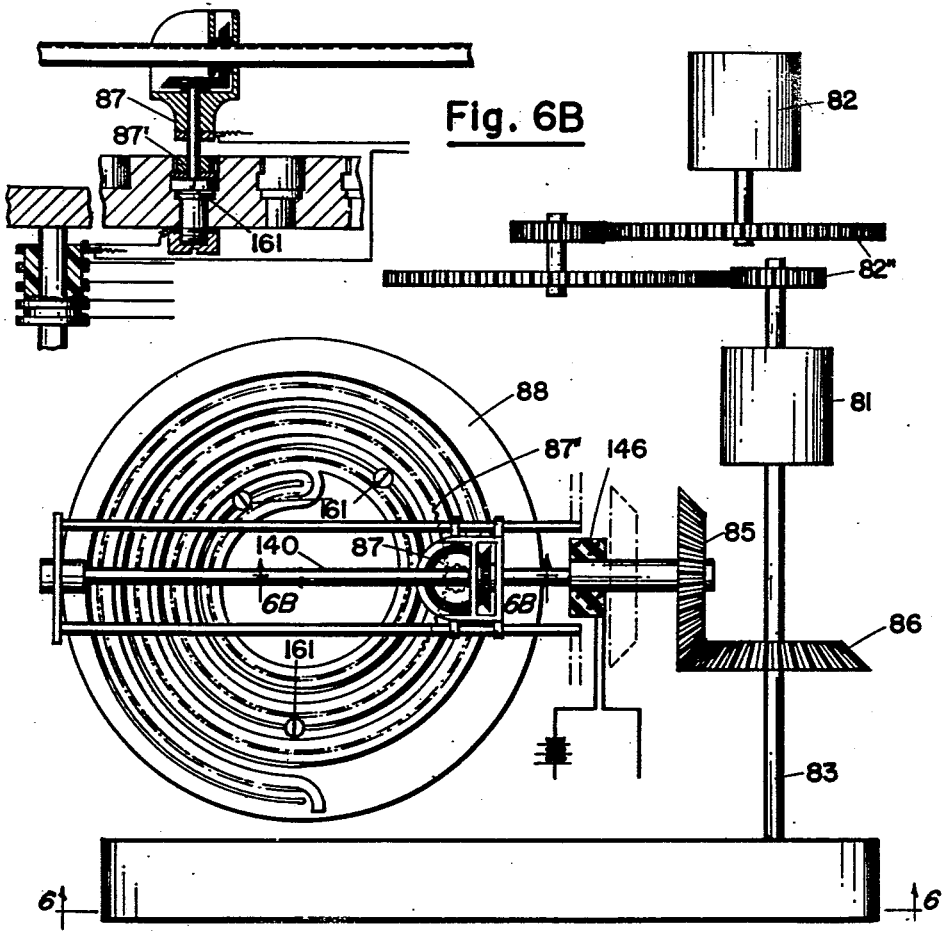
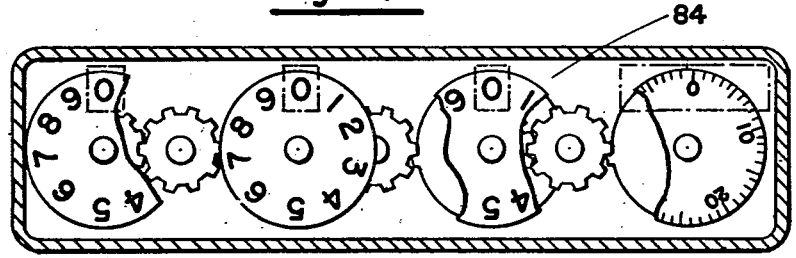
Inventor
Robert E. Jasperson July 13, 1948. R. E. JASPERSON 2,444,933
AUTOMATIC NAVIGATIONAL DIRECTOR
Filed Aug. 7, 1946 9 Sheets-Sheet 6

Inventor
Robert E. Jasperson

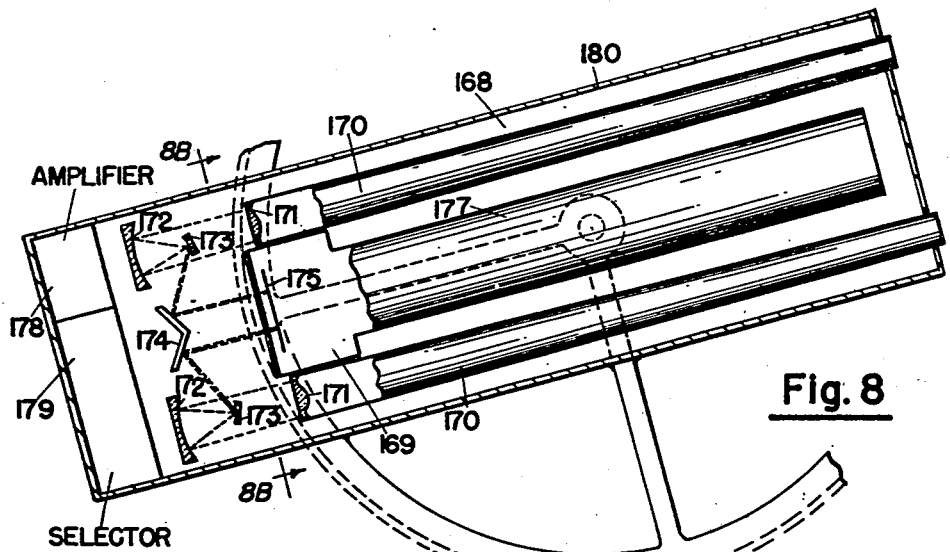
Fig. 8
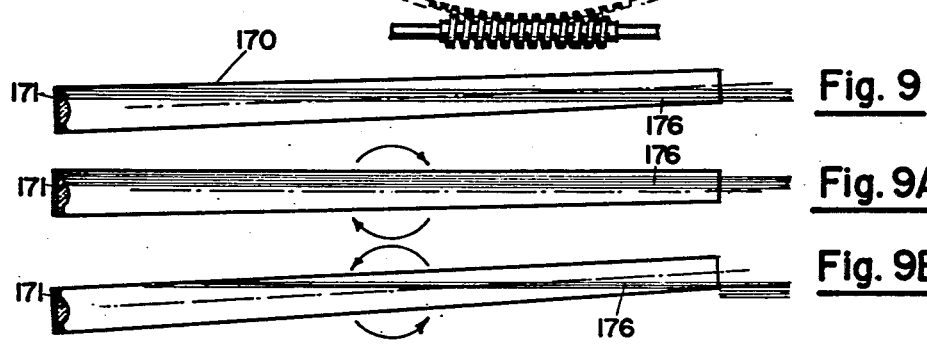
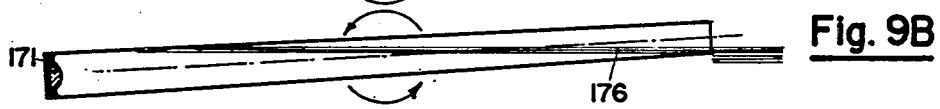
Fig. 9
Fig. 9A
Fig. 9B
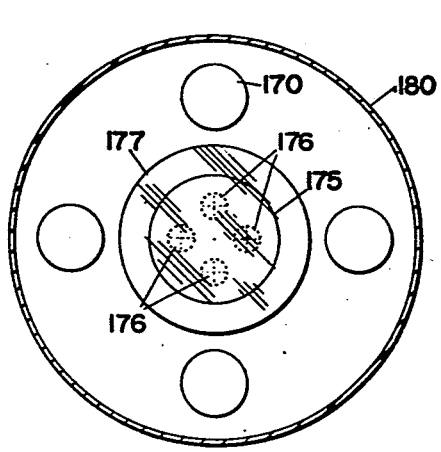
Fig. 8B
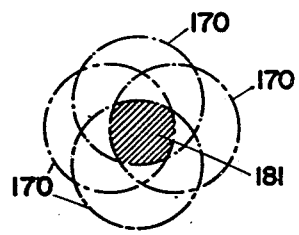
Fig. 8A
Inventor
Robert E. Jasperson Robert E. Jasperson Patented July 13, 1948

2,444,933

UNITED STATES PATENT OFFICE 2,444,933

AUTOMATIC NAVIGATIONAL DIRECTOR

Robert E. Jasperson, United States Navy

Application August 7, 1946, Serial No. 688,866

18 Claims. (Cl. 318—489)

(Granted under the act of March 3, 1883, as amended April 30, 1928; 370 O. G. 757)

This invention relates to means for determining and indicating automatically and continuously the geographical position of an airborne, sea or land craft or missile, and for directing said craft to any other geographical position by automatic reference to celestial bodies. In the form illustrated, it is particularly adapted for use on aircraft and guided missiles, since this type of vehicle usually changes its geographical position too rapidly to allow the normal time consuming observations and manual operation of navigational instruments now used on aircraft, to provide for proper and timely operation of the controls in the craft so as to direct it most expeditiously toward either a predetermined destination or toward a new destination suddenly determined upon.

One object of the present invention is to provide an instrument having means responsive to the relative location of celestial bodies for indicating automatically and continuously the geographical position of the instrument.

Another object is to provide a movable instrument having stabilized means which are trainable on and which will then automatically follow the position of two celestial bodes, and connecting linkage operated by these means for continuously indicating the instantaneous geographical position of the instrument.

A further object is to provide an instrument as defined in the above paragraph having further automatic means for guiding a craft or missile in which it is mounted to any other predetermined geographical positon over a great circle route or a series of great circle routes successively.

These and other more specific objects will become apparent as the description of an illustrative embodiment of this invention proceeds, having reference to the accompanying drawings, wherein:

Fig. 3 illustrates one form of stabilized star follower which may be used in the present embodiment of the invention;

Fig. 3A is a partial detail section of the Geiger counter end of the follower tube taken at 3A—3A in Fig. 3;

Fig. 3B is an enlarged partial detail of the damper means for the follower tube mounting;

Fig. 6 is a view of the counter end of a setting device for setting or resetting angular values of the slides such as 9, 10 and 38 or of the discs such as 3 and 4;

Fig. 6A is a plan view of the principal elements of this device;

Fig. 6B is a detail of the mechanism shown in Fig. 6A;

Fig. 8 is a diagrammatic sectional view of an alternative form of star follower tube based on the use of an orthicon tube;

Figs. 8A and 8B are partial views of portions of this star follower tube;

Figure 12:
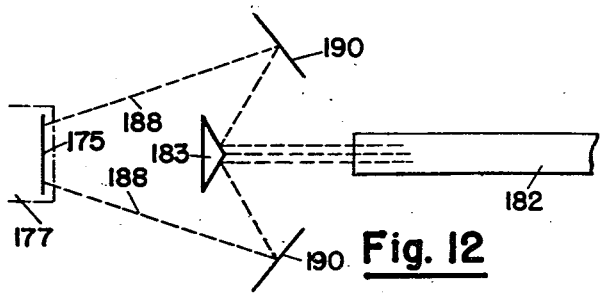
Figure 11:
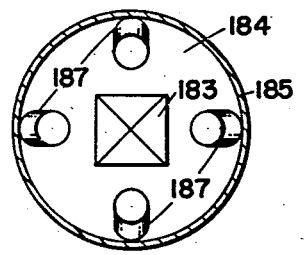
Figure 10:
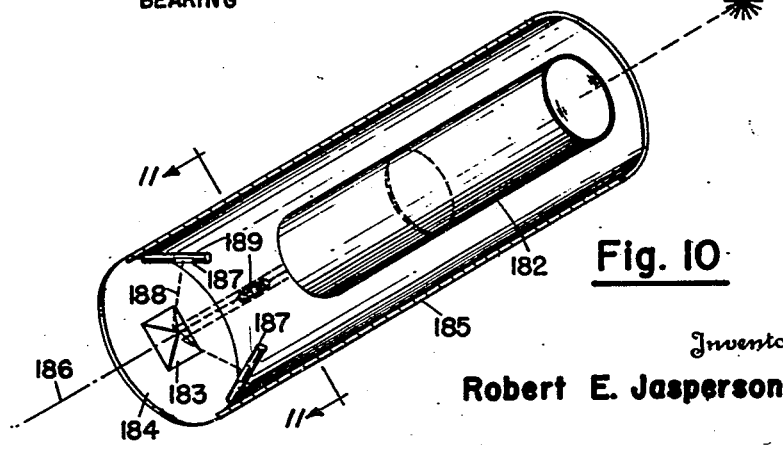
Figure 13:
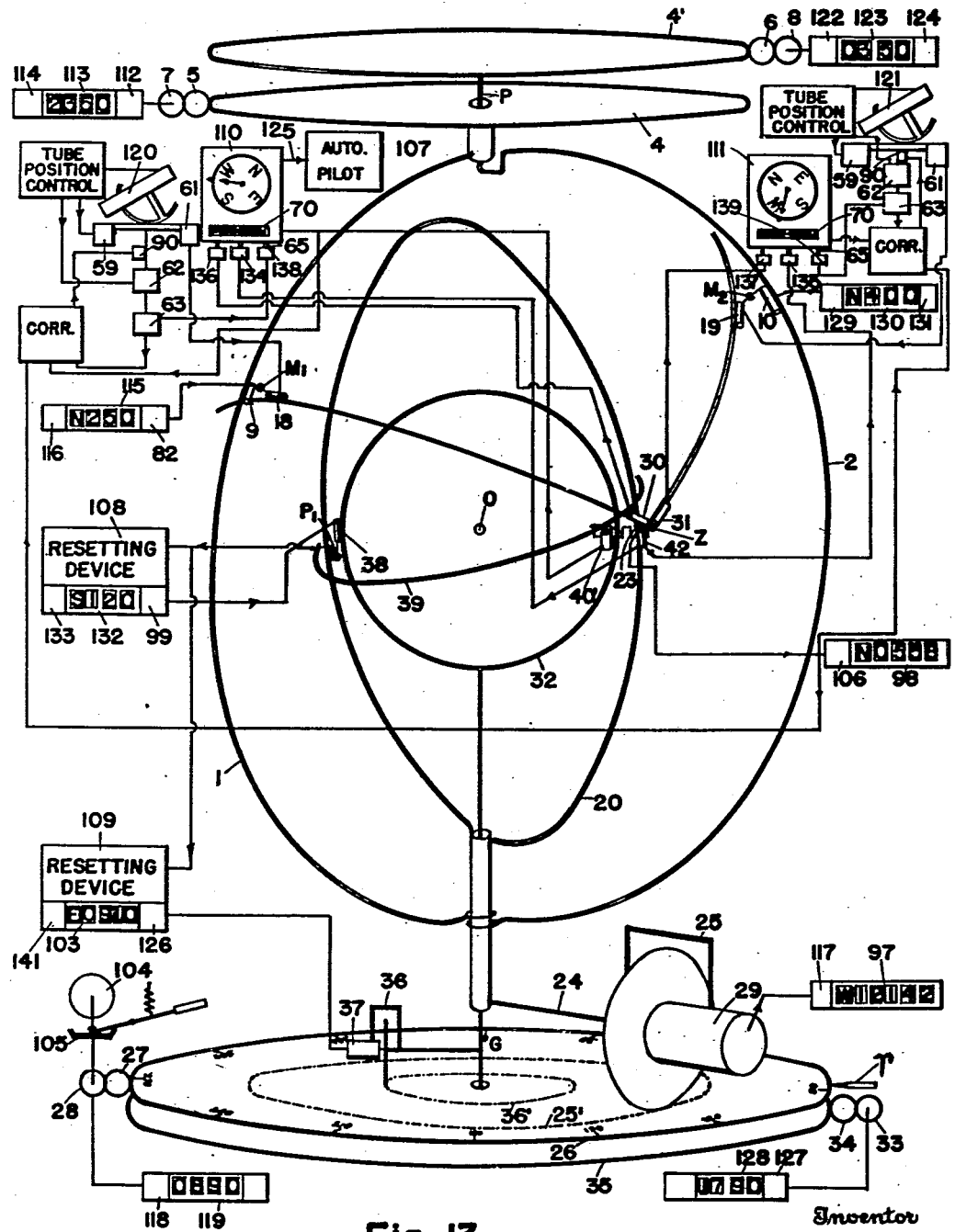
Figure 14:
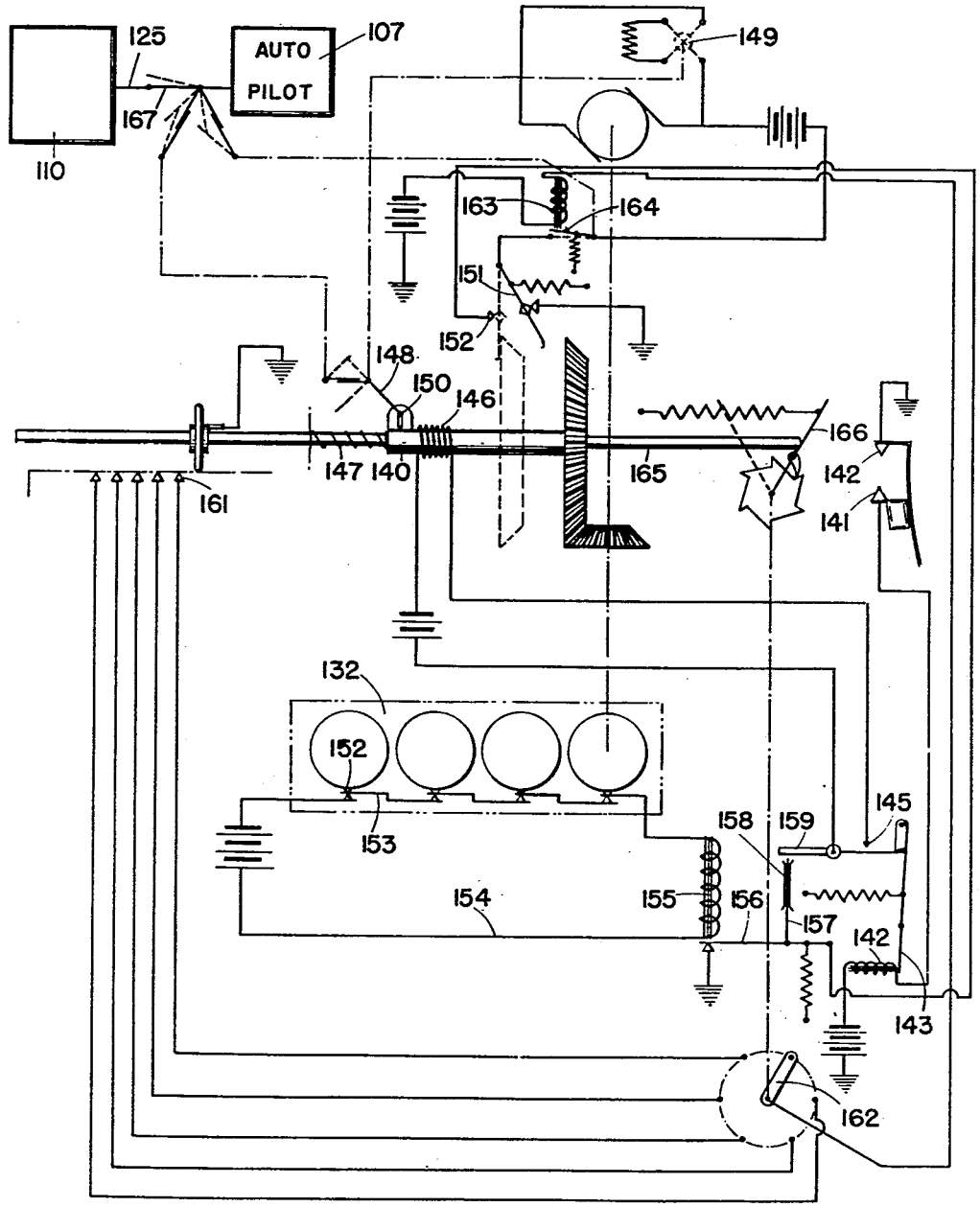

Figs. 9, 9A and 9B indicate the normal and two oppositely displaced positions of one element of this follower tube with respect to the beam from a star;

Fig. 10 is a perspective view partially in section of still another form of follower tube;

Fig. 11 is a sectional view of this form of tube taken at 11—11 of Fig. 10;

Fig. 12 illustrates diagrammatically a further modification of the follower tube elements;

Fig. 13 is a composite diagram of all the elements of a complete instrument showing the connections between the several parts for automatically guiding a craft or missile along a desired great circle route or series of routes consecutively; and Fig. 14 illustrates one form of circuit for use in connection with a resetting device such as shown in Figs. 6 and 6A.

The purpose of this invention as already pointed out, is primarily to provide means for determining and indicating automatically and continuously the geographical position of an aircraft or guided missile by means of direction followers of celestial bodies. Means may also be provided for actuating an aircraft automatic pilot in order to guide the aircraft along a predetermined course or to a given geographical position or consecutively to a series of geographical positions.

Figure 1:
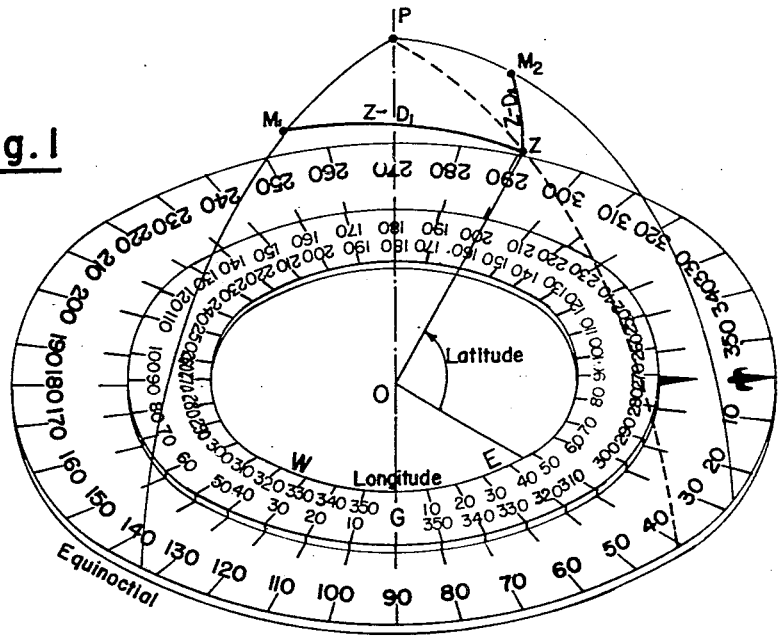
Fig. 1 is a schematic diagram showing the principal solution in spherical triangulation upon which this invention is based.

The fundamental principle may be understood by reference to Fig. 1 which represents the northern celestial hemisphere on which two celestial bodies, $M_1$ and $M_2$, are plotted, each in accordance with its declination and sidereal hour angle. Declination is measured along the great circle passing through a body and the celestial poles from the plane of the equinoctial as the reference plane. Sidereal hour angle is measured on the plane of the equinoctial throughout 360° from Aries (T) as a reference point. The declination and sidereal hour angle of a navigational celestial body may be obtained from the American Air Almanac for any given instant of Greenwich civil time. The S. H. A. of the bodies $M_1$ and $M_2$ as shown are approximately 133° and 27° and their D. are approximately 70° N and 75° N respectively. If $Z—D_1$ and $Z—D_2$ represent the angular distances of bodies $M_1$ and $M_2$ respectively from point Z, the intersection of these two great circle arcs $Z—D_1$ and $Z—D_2$ establishes the zenith Z of the instrument, which measures the altitudes of bodies $M_1$ and $M_2$ simultaneously, to be as shown. Zenith distances $Z—D_1$ and $Z—D_2$ equal 90° minus the respective true altitudes.

The latitude of the location of the instrument is the angular elevation of point Z or zenith above the equinoctial, as measured along the great circle passing through the pole and zenith, and may be seen to be approximately 65° N.

The longitude of the observer is the difference between the Greenwich hour angle of Aries (T) or 270° as shown, and the local hour angle of Aries (T) or 318°, making it 48° E, as indicated. The G. H. A. (T) is obtained from the American Air Almanac for any given instant of Greenwich civil time. It is the angular measure on the plane of the equinoctial from the meridian of Greenwich westward to the meridian of Aries (T). The local hour angle of Aries (T) is measured on the plane of the equinoctial from the meridian of an observer east or west to the meridian of Aries (T). In the example shown in Fig. 1 the G. H. A. (T) is 270°, the L. H. A. (T) is 360°—42°=318°. The difference, 318°—270°=48°, establishes the longitude of the observer, and is east.

Figure 2:
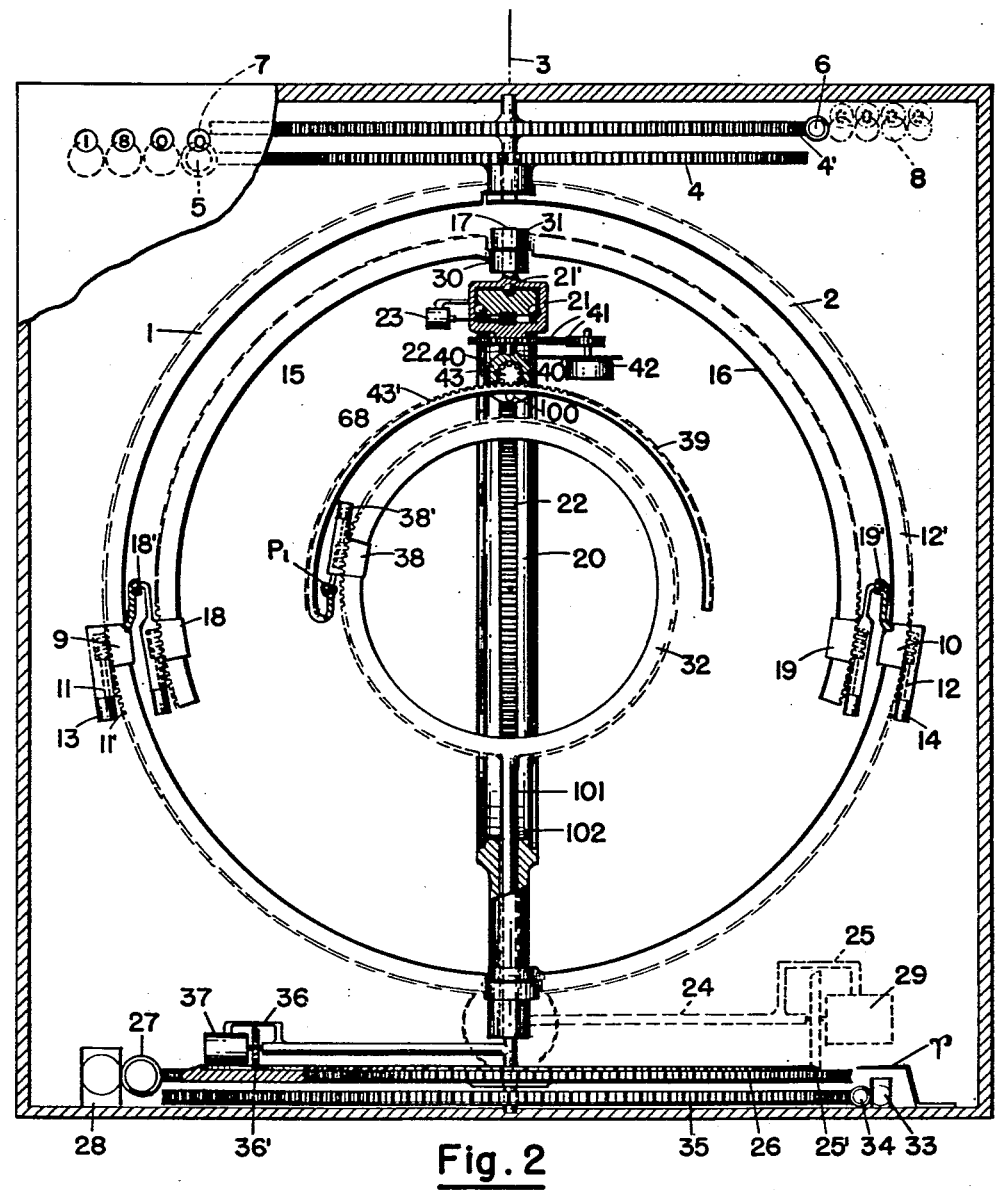
Fig. 2 is an outline sketch of the computer comprising a mechanical linkage used in the solution of the problems in spherical geometry involved, including a link for indicating the course to any new geographical location.

Fig. 2 illustrates the computer which has means provided for setting up on great circle arcs the several known elements of the celestial triangle and for indicating the resulting desired values, and for other purposes. Semi-circular metal rings 1 and 2 represent the great circles through two celestial bodies. They are pivotally mounted about a common vertical axis 3 representing the axis of the celestial sphere. These rings may be rotated and set to any given values of sidereal hour angles (S. H. A.) through the medium of worm gears 4 and 4', tangent screws 5 and 6 and Selsyn motors 7 and 8, respectively, actuated directly or by remote Selsyn generators in a manner to be described.

Declination values may be set on rings 1 and 2 by means of slides 9 and 10 actuated by tangent screws 11 and 12 meshing with worm gears 11' and 12' on the peripheries of the rings 1 and 2 and driven by Selsyn motors 13 and 14 remotely controlled by Selsyn generators. In Fig. 2 ring 1 is set to 180° S. H. A. and ring 2 to a value of S. H. A. of 0°. Slides 9 and 10 are set to values of declination of 0°.

Rings 15 and 16 represent the great circle arcs passing through two celestial bodies and the zenith of an observer. They are hinged together at pin 17 so as to be pivotable about the same common axis passing radially through the zenith point. Values of zenith distance may be set on rings 15 and 16 by means of slides 18 and 19, which are actuated remotely in a manner similar to that employed with the slides 9 and 10 on the declination circles. Slides 18 and 19 are secured to slides 9 and 10 by ball-and-socket joints 18' and 19'. The slides 18 and 19 are shown in a position of 90° zenith distance (0° altitude).

In Fig. 2 the zenith of an observer, as represented by pin 17, is in the north celestial pole (observer at the north pole). As varying values of sidereal hour angle, declination and zenith distance (altitude) are introduced, the position of the zenith will shift. To measure this shift in position a vertical ring 20, representing the local meridian of an observer, is employed. Pin 17 is slidably mounted on ring 20 by means of casing 21, which is provided with ball bearings 21' to reduce friction and eliminate lost motion. The position of casing 21 and pin 17 with respect to ring 20 is measured by the rotation of gear wheel 22 meshing with a gear track 22' on the inner periphery of ring 20. The rotation of wheel 22 is transmitted directly to Selsyn generator 23 and indicated remotely as angular measure by a permanently connected Selsyn motor operating an indicator scale. This is a measure of latitude, here shown as 90° north. As the casing 21 is moved in either direction along the ring 20 the indicator shows a corresponding decrease in north latitude, going through 0° at the equinoctial plane, then increasing in south latitude toward 90° at the south pole.

Ring 20 is free to turn about a vertical axis as the position of casing 21 is varied by changes in the values of latitude. Secured to the shaft which supports ring 20 is an arm 24 to which is attached a gear wheel 25. For clarity this assembly is illustrated in phantom in a position 90° from the plane of the local meridian (ring 20).

A circular plate 26 is provided to introduce values of Greenwich hour angle of Aries (G. H. A. T) by means of tangent screw 27 and Selsyn motor 28. Gear wheel 25 meshes with a circular gear track 25' on the face of plate 26. The position of wheel 25 with respect to a reference point on this track (Greenwich) is a measure of the longitude of an observer and is indicated remotely by means of Selsyn generator 29 and a Selsyn motor at the observer's station.

To summarize the operation of the local position indicator briefly: The altitudes of two navigational stars are automatically observed simultaneously by setting the star followers within range of the respective stars, and the Greenwich civil time is noted. The known values sidereal hour angle, declination, Greenwich hour angle of aries and altitude are introduced into the computer directly or by remotely operated Selsyn systems if the operator's station is at a point remote from the instrument. The unknown values, latitude and longitude are thereby instantly computed and may be indicated directly on the instrument or by remote-reading Selsyn-operated indicators suitably located at the observer's remote station. Angular values may be inserted and indicated with an accuracy of 1' of arc in a manner to be described presently.

The azimuth (true bearing) of the celestial body $M_1$ represented by the hinge axis between slides 9 and 18 with respect to the local meridian of an observer (ring 20) is measured by the angle which ring 15 makes with ring 20 and is transmitted by Selsyn generator 30 (secured to ring 15) to a Selsyn motor and is indicated remotely on a suitable scale at the observer's station. In a like manner the angle which ring 16 makes with ring 20 is transmitted by Selsyn generator 31 to a remote indicator where it is indicated as the azimuth of the celestial body represented by the hinge between slides 10 and 19 with respect to the local meridian. The purpose in thus indicating the azimuths of two stars will be disclosed presently.

Ring 32 represents the local meridian of any geographical point $P_1$. It is pivotally mounted on a vertical shaft and may be rotated to any given longitude by means of Selsyn motor 33 driving tangent screw 34 meshing with worm gear 35. Its angular position with respect to the longitude scale on the face of plate 26 is measured by a gear wheel 36 meshing with a track 36' on plate 26 and indicated remotely by means of Selsyn 37. The latitude of the given point $P_1$ is represented by slide 38 remotely actuated in a manner similar to that employed in setting values of declination and zenith angle.

A great circle arc represented by partial ring 39 joins the zenith of the given point $P_1$ with the zenith Z of an observer (casing 21). The angle which ring 39 makes with ring 20 is measured by the position of slide 40, rotatably secured to casing 21, with respect to casing 21, and is transmitted through gear-train 41 and Selsyn generator 42 to a remote Selsyn motor where it is indicated as the great circle course from zenith Z of observer to zenith $P_1$ of the given geographical point. A gear wheel 43 meshing with a track on the outer periphery of ring 39 measures the great circle distance from present position to destination and is transmitted by Selsyn 40' to a suitable remote dial. The preferred location of the controls and indicating dials mentioned herein is on the front or the top of the casing which houses the celestial computer just described if the observer's station is at the instrument.

The star follower, Fig. 3, represents one preferred method of measuring continuously the altitude of a celestial body and of conveying the observed data to the computer illustrated in Fig. 2 and for other purposes. The device consists of a platform 51 secured to a gimbal assembly 51' which is connected to a self-erecting gyroscope 52 by means of a link 53. The center of rotation of the external gimbal assembly coincides with the center of rotation of the gyroscope, whose spin axis is maintained in the vertical plane through the action of a steel ball rotating in cup 54. The gyroscope is of the type employed in the conventional flux-gate aircraft compass and forms no part of this invention.

When disconnected from the gyro the external gimbal assembly is maintained in a state of balanced equilibrium by weight 55 attached to vertical gimbal ring 56. When in operation, platform 51 serves as a horizontal reference plane from which the altitude of a celestial body may be measured.

The measurement of the position of a star by this form of followers is based on the theory that the stars radiate gamma rays and that these rays may be utilized to position the axis of a tube with respect to the direct line from a star to a geographic location. As visualized therein the gamma rays from a star whose altitude is 0° are reflected and concentrated by parabolic reflector 57 into a beam which is focused upon a target 58 consisting of an array of Geiger counters 58' suitably shielded from the direct gamma rays.

Means are provided through the medium of the gamma rays when deflected vertically off the target toward one of the vertically opposed Geiger counters 58' to actuate motor 59 and cause tube 60 to be elevated or depressed. The angle of elevation of tube 60 is transmitted by Selsyn generator 61 to slide 18 or 19 of Fig. 2 as well as to a remote reading indicator. The angle of train of tube 60, actuated by motor 62 and a suitable gear train 62' when tube 60 is displaced in azimuth from the star so that the gamma rays are deflected toward one of the horizontally opposed Geiger counters 58', is transmitted electrically by Selsyn generator 63 to shaft 65 of Fig. 5 which actuates pointer 66 to indicate the relative bearing of a star with respect to the fore-and-aft centerline of an aircraft.

Fig. 3B shows one form of spring buffer or damper means for the tube mounting 60' which is hereinafter more fully defined.

Figure 4:
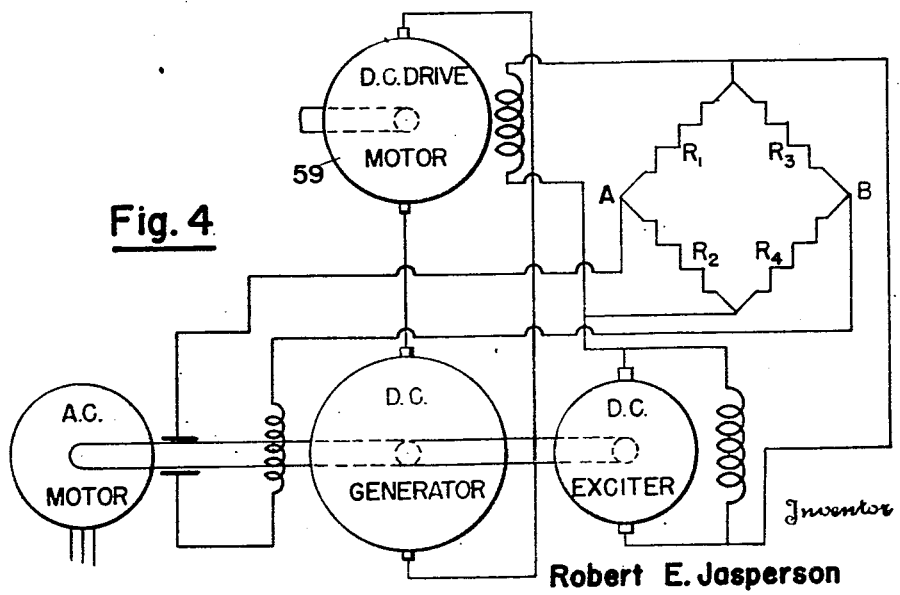
Fig. 4 is a portion of the wiring diagram of the circuit used in connection with this star follower in the above embodiment.

Fig. 4 represents a preferred circuit for utilizing the gamma rays from a star, when the tube is deflected from alignment with the star, to actuate the driving motors 59 and 62 of Fig. 3 to bring the tube into alignment. In Fig. 3A the target 58 of Fig. 3 is shown on an enlarged scale. This target consists of four Geiger tubes 58', or counters, of conventional design, arranged as shown in vertically and horizontally opposed positions with respect to the target. The concentrated beam of gamma rays is represented by a small circle 49 which travels in a circular or elliptical path under the influence of the precessional torque of the steel ball rotating on the horizontal cup 54 of Fig. 3. As long as the center of the path which beam 49 follows coincides with the direct line between the star under consideration and the geographic position of the instrument itself, the tube is trained directly on that star. As the position of the axis of the tube shifts from the direct line to the star, the beam of the gamma rays 49 bombards one or more of the four Geiger counters. If it impinges upon the upper counter, for example, an electrical impulse is created which, when suitably amplified, may be utilized to vary the resistance in one leg of a conventional Wheatstone bridge. Assume that it causes a decrease in resistance in $R_1$ of the bridge A—B. The bridge becomes unbalanced, making point A positive with respect to point B. The voltage across A—B is impressed on the field of the D. C. generator, causing the drive motor to rotate. This is motor 59 of Fig. 3 and results in tube 10 being elevated until beam 49 (Fig. 3A) no longer impinges on the upper Geiger counter. The Wheatstone bridge is then balanced and the voltage between points A and B is zero. In this case the output of the D. C. generator is zero so that the drive motor 59 is stopped.

If beam 2 is displaced so that its rays bombard the lower Geiger counter, the resistance of $R_2$ is decreased, and the drive motor rotates in the opposite direction. The speed at which the drive motor rotates is dependent on how much the resistance of $R_1$ or $R_2$ is reduced.

As beam 49 impinges upon the Geiger counters at either side of the center of target 58, a similar Wheatstone bridge becomes unbalanced, causing motor 62 or Fig. 3 to train right or left to bring the center of the path of beam 49 (Fig. 3A) back to the center of target 58.

Thus tube 10 of Fig. 3 is caused to "point" continuously at a given star, and the altitude and relative bearing of that star are transmitted continuously to the solver and the indicator by Selsyns 61 and 63, respectively.

An acceptable alternative method of control consists of a conventional image orthicon pickup tube which employs the principle of secondary electronic emission to convert photo-electrons produced by a source of light such as a star into an output signal which may be utilized to control the resistance of a Wheatstone bridge.

Figure 5A:
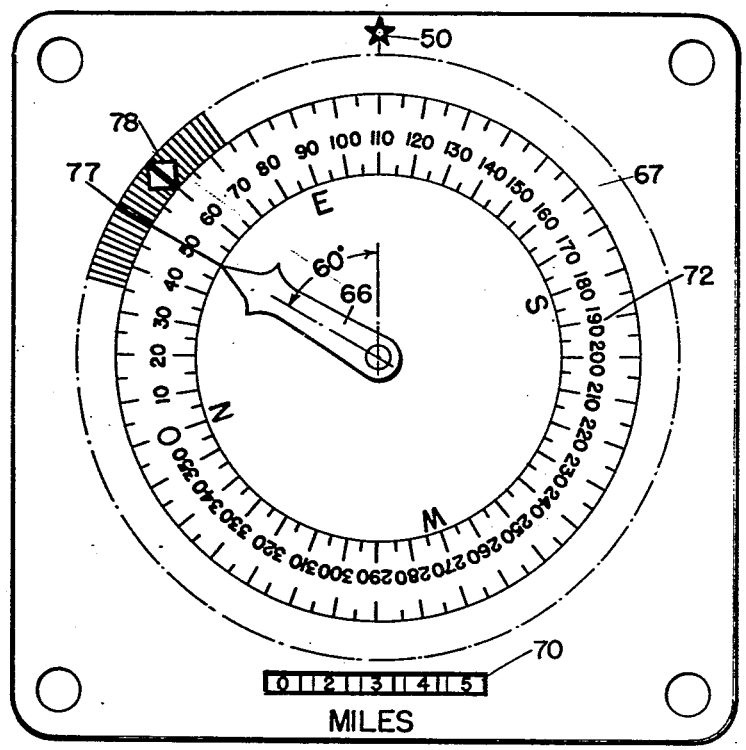
Fig. 5A is a plan view of this indicator.
Figure 5:
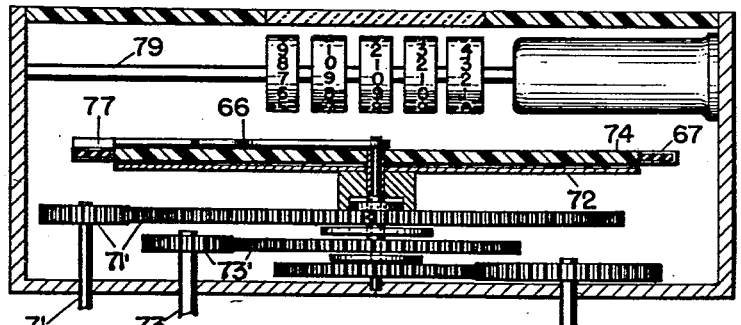
Fig. 5 is a sectional view of the relative bearing indicator of the heading and course, and including a counter showing the distance from a destination, with automatic control means for maintaining the great circle route to the destination.

The output from Selsyn generator 30 or 31 of Fig. 2 is applied to shaft 71 of Fig. 5 which, through a suitable gear train 71', rotates dial 72, graduated into 360°, with respect to a reference point 50 indicating the azimuth or true bearing of one of the stars being observed. The output from Selsyn generator 42 of Fig. 2 is applied to shaft 73 of Fig. 5. This value is the great circle course to be steered to destination and is transmitted through a gear train 73' to dial 74. That portion of this dial which is above dial 72 is transparent, while that portion outside of dial 72 contains a variable electric resistance 67 of any suitable form such as a compressed annular coil.

The output of Selsyn generator 63 represents the relative bearing of the observed star with respect to the fore-and-aft centerline of the aircraft. This value is transmitted through shaft 65 (Fig. 5) and a gear train to pointer 66. It represents on dial 72 the heading of the aircraft.

In example shown in Fig. 5 the true azimuth of a star as obtained from the computer is 110° while its relative bearing is 60°. The difference between the two, i. e. 050°, is the true heading of the aircraft. If the great circle course is 060°, the plane's head must be moved 10° to the right. In manual control it is necessary merely to match pointers to steer the course alloted.

Automatic steering is accomplished by means of an electrical contact 77 secured to pointer 66. This contact slides across a resistance imbedded in the outer portion 67 of dial 74. The contact and resistance are connected to a Wheatstone bridge in a circuit similar to the one previously described, which in turn controls the speed and direction of rotation of a steering motor. When contact 77 is directly over bug 78, no current flows, but when 77 and 78 are not matched, a current does flow, and the steering motor is actuated to bring the aircraft back on course.

The output of shaft 43 of Fig. 2 is transmitted through suitable Selsyns to shaft 79 of Fig. 5. This value is the great circle distance to destination and is displayed by means of suitable dials and a window 70 of the instrument.

It may be desirable to employ two indicators and controllers, each actuated in azimuth by a separate star as shown in the composite view of Fig. 13. One would then serve as a check on the performance of the other. Alternatively, the output from azimuth motors 30 and 31 of Fig. 2 may be applied successively to shaft 71 of Fig. 5.

In angular measurement, a preferred method for introducing and indicating angular values is illustrated in Figs. 6 and 6A. It is desirable that the ratio employed in the several worm wheel gear trains of Fig. 2 be 18:1. If the ratio between worm gear 4 and tangent screw 5, for example, is 18:1, the tangent screw will require 18 revolutions to cause one complete rotation of the worm gear.

In Fig. 6A a small D. C. motor 81 drives a Selsyn generator 82 through a gear train 82' with a ratio of 20:1 and also turns shaft 83, which is connected directly to a series of indicator dials 84.

These dials are of conventional design and merely add and display the number of turns applied to shaft 83. The unit dial connected to the actuating shaft may be sub-divided into 60 equal parts representing minutes of arc or, preferably, may be geared in a 6:1 and a 10:1 series ratio to additional dials which will record minutes of arc as numerals rather than graduations.

As applied to the sidereal hour angle scale 4' of Fig. 2, for example, if 360 turns be applied to shaft 83 of Fig. 6A, the numerals 3, 6 and 0 will appear on the face of counter 84. Due to the stepdown ratio of 20:1 only 18 turns will be applied to the shaft of Selsyn generator 82. These 18 turns result in one complete rotation of worm gear 4' (Fig. 2).

Means are provided for introducing in succession a variety of predetermined values (declination, for example) as follows:

At any desired point along the great circle track 39 of Fig. 2 a movable contact 68 may be secured. When wheel 43 reaches this contact, a switch (not shown) is opened which disconnects the star followers from the computer, a relay disconnects bevel gear 85 from bevel gear 86 (Fig. 6) and motor 81 is operated in reverse to reduce the original value of declination of slide 9 (Fig. 2) to zero. Gears 85 and 86 (Fig. 6A) are then re-engaged and motor 81 again is reversed in direction. A gear assembly 87 having a pinion gear 87' traveling in a spiral groove 87'' of cam plate 88 is moved a predetermined distance along the groove corresponding to a new value of declination, at which point it reaches a preset contact 161 and the system is de-energized. The star followers are then reconnected to the computer mechanism. During the short interval required to perform this function, the autopilot is shifted to a conventional control which will guide the aircraft along the last course being steered.

New values of sidereal hour angle and declination as well as latitude and longitude of destination may be introduced in a similar manner as before. Likewise, the train and elevation of the star followers may be reset and the star followers shifted from one pair of working stars to another either separately or in unison, and the aircraft may be guided from one geographic position to another. The number of shifts in working stars and in geographic positions is limited only by the size and range of cam plate 88.

Tube 60 and motors 59 and 61 are secured to a horizontal bar 60', as previously noted, rotatable about platform 51 but connected to it by means of a yoke 46, 46 containing two springs 45, 45 which are secured to an arm 44 which is an extension of the horizontal bar carrying tube 60 and its support 75. Also secured to this horizontal bar is a small gyro 48 with its spin axis in the horizontal plane. This gyro has but two degrees of rotational freedom. Its purpose is to stabilize tube 60 in the line of sight under the influence of sudden yawing of the aircraft. Such a deviation from course would tend to throw the star follower away from the star being followed with the possibility of losing it. Gyro 48 would tend to remain fixed due to its gyroscopic inertia and the result would be a stretching of one of the two springs. When the aircraft again settled down, the tension on the springs would be relieved and arm 44 would be aligned with the center of yoke 46, 46.

Figure 7:
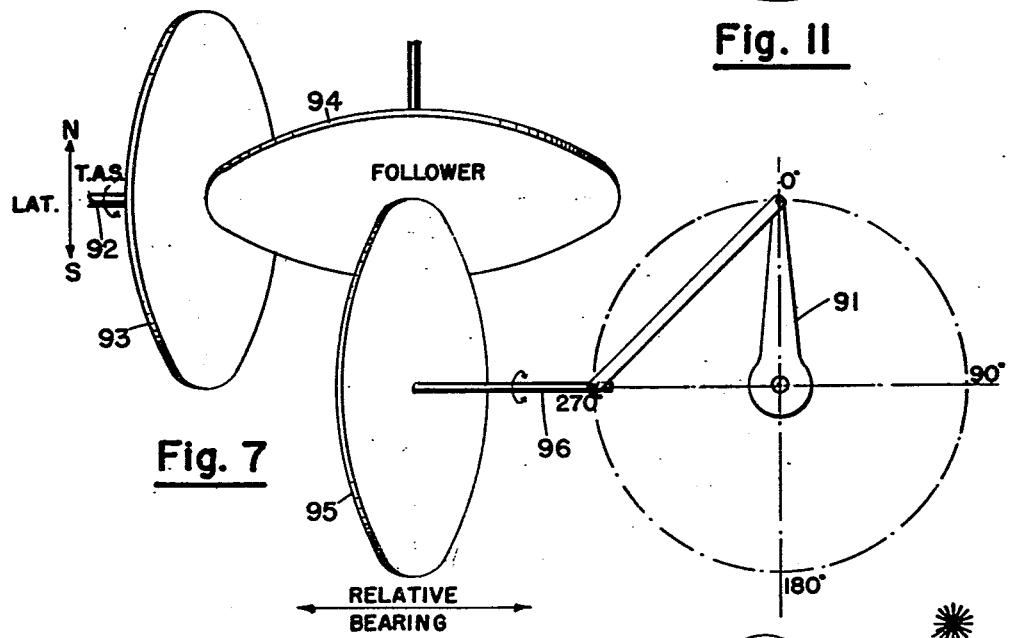
Fig. 7 is a perspective view of parts of a correcting device for correcting the altitude values delivered by the star followers in accordance with effects due to Coriolis acceleration as determined from true air speed, bearing and latitude.

Automatic means such as shown in Fig. 7 are provided for correcting the altitude of a star to compensate for the coriolis effect of the earth's rotation. Coriolis acceleration is a function of true air speed, latitude and the relative bearing of the star observed. Corrections for this effect are contained in the Air Almanac and may amount to as much as 30 minutes of arc or more. The means provided for applying these corrections automatically consists of an adjustment of the position of pin 76 with respect to ring 56. A collar 80 is attached to pin 76. This collar is actuated by a screw thread 89 turned by a Selsyn motor 90, the screw thread being rotatably mounted on ring 56.

The relative bearing of the observed star is transmitted by Selsyn generator 63 to arm 91 of a correction computer (Fig. 7). This computer also receives values of true air speed and latitude and returns the corrections electrically to Selsyn motor 90 responsive to the speed of rotation of the shaft 96.

The true air speed is measured by the rate of travel of wheel 43 along track 39 (Fig. 2) and is transmitted continuously to the T. A. S. shaft 92 of Fig. 7. The friction disc 93 attached to this shaft imparts rotary motion to a follower disc 94 mounted at right angles. The speed and direction of rotation of the follower disc is controlled by the position of one disc relative to the other, which position is a function of latitude. As shown in Fig. 7 the shaft 92 is positioned in accordance with a latitude of 0°, hence no motion is imparted to the follower disc since the correction is zero at latitude 0°.

A third friction disc 95 is mounted at right angles to the follower disc as shown. Its position with respect to the follower disc is a function of relative bearing. The correction for relative bearing is zero at relative bearings 0° and 180° and is maximum at 90° and 270°. In north latitude the sign of the correction is plus when the relative bearing lies between 0° and 180° and is minus between 180° and 360°. In south latitude the signs are reversed. The position of the relative bearing disc 95 with respect to the follower disc 94 is controlled by a bell crank lever arm 91 as illustrated.

The rotating motion finally imparted to the shaft 96 attached to the relative bearing disc 95 is converted into angular measure in a manner similar to that employed in an automobile speedometer, which forms no part of this invention.

This angular position is imparted to selsyn motor 90 of Fig. 3 as the total correction to altitude.

In operation, assuming a pair of known stars $M_1$ and $M_2$ to be used as the reference stars, their elevation values continuously obtained by a pair of star followers are continuously transmitted by the respective Selsyn generators and motors to the slides 18 and 19, while their relative hour angles and their declinations, as obtained from the Air Almanac for the particular time of the year, are transmitted by Selsyn units 7 and 8, and 13 and 14 respectively, to move the slides 9 and 10 into their relative positions, duplicating the relative positions of the two stars in the celestial sphere. As a result, the cage 21 will assume the relative zenith position of the instrument's location, as represented e. g. by the point Z in Fig. 1, if $M_1$ and $M_2$ represent the celestial positions of the two stars, having elevations $D_1$ and $D_2$, respectively, Z being 90°.

The casing 21 would thus cause the ring 20 to assume a relative hour angle position corresponding to the longitude at the instrument's location, which would be indicated by the relative position of the arm 24 with respect to the longitude track 25' on disc 26, this indication being transmitted by Selsyn generator 29 to the longitude scale 97 which may be placed near the observer. Disc 26 is turned by a clock mechanism 104 through clutch 105, which is used to disconnect the drive for properly setting the G. H. A. when starting up the instrument. The latitude may be obtained from the movement of pinion 22 along the internal gear 22' on the inside of ring 20, as transmitted by Selsyn generator 23 to a connected motor 106 for indicating the instant latitude of the instrument's location on a latitude scale 98 placed near the observer.

Thus a means for continuously and automatically indicating an instrument's changing location may be observed or recorded by recording instruments with respect to time if desired.

By incorporating additional elements this instrument may further be used to measure the distance and bearing to any other geographical positions along great circle routes successively, and may be connected to means for guiding a craft or missile in which the instrument is mounted along said great circle routes in any order desired.

This may be done by the addition of the ring 32 representing the hour circle of another geographical position, having a slide 38 thereon representing that position and being adjustable along the ring to the corresponding latitude of said position by a Selsyn motor 38' controlled by a generator 99 manually or automatically operated at a predetermined time by suitable control means. This slide 38 is pivotally connected to a concentrically formed great circle distance arm 39 slidably connected between a guide roller 100 and distance measuring gear 43 on the casing 21. The gear 43 is connected through a Selsyn system to a counter 70 indicating its relative distance from the other geographical position represented by the pivot $P_1$ mounted on the slide 38. The pivot is offset from the slide in the plane of the great circle arm 39 so as to allow the pivot to be moved into the 90° S. latitude position within the opening 101 in the ring support 102. The ring 32 may be set by means of motor 33 operating worm 34 to turn disc 35 with shaft 102 and gear 36 until the longitude of the desired geographical position is shown on longitude indicator 103.

In addition to the local latitude and longitude indicators 98 and 97, respectively, other indicators and controls may be provided, such as the relative bearing indicators 110, 111 and control connection 125 to an autopilot 107 as well as resetting devices for automatically resetting any one or more of the pivots $M_1$, $M_2$ and $P_1$, such as devices 108 and 109 for resetting the pivot $P_1$, e. g., by moving the respective hour circles and slides thereon to new positions, as may be desired.

These parts may be seen diagrammatically illustrated in the composite view of Fig. 13, showing the relations of the several elements in one form of a complete instrument made in accordance with the present invention.

As already pointed out, the instrument is oriented on a vertical axis representing the celestial polar axis and a reference radial direction therefrom representing ϒ.

In operation, the pivots $M_1$ and $M_2$ are positioned in space with reference to this orientation in accordance with the location of two known stars in the celestial sphere as obtained from the Air Almanac. The value of the hour angle of aries for $M_1$ is entered by means of the Selsyn motor 7, worm 5 and worm wheel 4 which is fixed to the hour circle 1. This motor may be manually operated or by means of a Selsyn generator 112 on indicating counter 113 showing the hour angle in degrees and minutes. Generator 112 may be manually operated, or automatically by motor 114 suitably controlled either manually or automatically as will be later described. The declination of $M_1$ is entered through slide 9 in a similar manner by means of motor 13 on slide 9 which may be operated by Selsyn generator 82 on counter 115 which may be operated manually or by motor 116 through automatic control.

The hour angle and declination values for $M_2$ are similarly entered by operating Selsyns on counters 123 and 130, respectively.

A star follower 120, operatively connected to set slide 18 along the arcuate zenith distance arm 15 in accordance with the elevation of star $M_1$, is set within range of $M_1$ either manually by sighting it on the star, or remotely by turning Selsyn generators 61 and 63 through operation of motors 59 and 62 to the approximate elevation and relative bearing, respectively, of the star as determined by manual observation, whereupon the follower will then adjust itself automatically on the star and deliver the true elevation value through Selsyn generator 61 to the Selsyn motor on slide 18 for positioning point $M_1$ at the true zenith distance from Z. Another star follower 121 is similarly set on $M_2$ and controls the positioning of the slide 19 along the zenith distance arm 16 in accordance with the true elevation of $M_2$. Thus the local position pivot Z is established, determining the position of the local hour angle circle 20 indicating local longitude through the Selsyn generator 29 and motor 117 for indication on counter 97, and the position of cage 21 along this circle 20, indicating the local latitude through Selsyn generator 23 and motor 106 for indication on counter 98.

It is to be understood that the Greenwich hour angle of disc 26 is continuously maintained by operation of the disc 26 by clock mechanism 104 after it is once properly set by motor 28, with the clutch 105 temporarily released; the motor 28 is either manually operated to obtain the instant reading of a peripheral scale on disc 26 with reference to the pointer T, which is the Aries reference point, or motor 28 may be operated remotely by Selsyn generator 118 on indicator 119 showing the G. H. A. of aries.

Star followers 120 and 121 are operatively connected, as mentioned above, to move slides 18 and 19 in accordance with the changing values of elevations of the two stars so as to maintain the pivot Z on the local zenith as the instrument is moved along any course on the earth.

In order to establish a great circle course which is to be followed to any other geographical position, a pivot $P_1$ attached to a great circle arm 39 is moved to that position by means of a slide 38 on hour circle 32. The circle 32 is moved in accordance with the longitude of this geographical position by operation of Selsyn motor 33 either directly or remotely through Selsyn generator 127 on counter 128 which indicates in degrees and minutes the hour angle of aries of this position, corresponding to its E or W longitude as determined from the position of gear 36 along the track 36' on the G. H. A. disc 26 and as indicated on counter 103 through Selsyn generator 37 and motor 126. The slide 38 is moved by Selsyn motor 38' operated by generator 99 on counter 132 in accordance with the latitude of the geographical position as indicated on the counter. The great circle arm 39, being slidably mounted in cage 21 and geared to Selsyn generator 46 through gear 43 and rack 43', measures the distance from the geographical position to the local position of the instrument, which distance is indicated on counters 70 of indicators 110 and 111. The angle made between the great circle arm 39, which restricts the direction of cage 40 in which the arm is slidably mounted, and the local hour circle ring 20, which restricts the direction of the cage 21 which is slidably mounted thereon, is a measure of the true bearing of the great circle course to the geographical position $P_1$, and is indicated by Selsyn generator 42 transmitting the value of this angle to motors 134 and 135 on indicators 110 and 111 to show the true course bearing on the dials of these indicators.

The true bearing values of the stars as measured by Selsyn generators 30 and 31 are transmitted to motors 136 and 137 of indicators 110 and 111 to be indicated by the corresponding dials. The relative bearing values of the stars as measured by the star follower Selsyn generators 63, 63 are transmitted to motors 138 and 139 of indicators 110 and 111 to be shown as heading with respect to the stars' azimuth and may therefore be compared with the bearing of the great circle to the geographical position involved, so that the heading may be corrected to follow the great circle course. This may be done automatically by an electric circuit through a contact 77 on the heading hand 66 and a resistance coil 67 for controlling a reversing motor (not shown) to operate the steering controls in an autopilot 107 or other direction control means for matching the heading with the great circle course and thus directing the craft or missile to the other geographical position by the shortest geographical route.

Automatic control means 108 and 109 may be provided, similar to the resetting device shown in Figs. 6 and 6A, for temporarily disconnecting the instrument from the autopilot upon reaching this geographical position and resetting pivot $P_1$ to a new geographical position. Additional resetting devices may be used to change the star followers to new stars which will be accessible during the succeeding journey if the stars being used have meanwhile approached the limit of the effective range. The resetting devices may also be started at any intervening point along the course before reaching the geographical point, by contacts 68 placed at intermediate points on the great circle arm 39 and on the cage 40, or by any arrangement of the contacts 161 on the disc 88 in the respective resetting devices. For example, if it is desirable that one of the star followers be changed to another star en route, the point at which this change is to be accomplished may be selected by proper positioning of control contacts 68 (Fig. 2) to start the cycle of operations in the proper resetting devices for making such change.

One form of circuits used in the resetting devices that may e. g. be adapted to reset the latitude and longitude of the point $P_1$ to a new destination toward which the craft or missile is to be guided, is shown in Fig. 14. The circuit shown includes the contacts 141 and 142 which come together when the point Z, or the local position, reaches the destination, or $P_1$, along the great circle arc 39. The closing of these contacts will operate solenoid 142 which operates the trip mechanism 143 to release switch 144 into closing position on contact 145, whereupon the solenoid 146 on shaft 140 is energized and draws the gear 85 out of mesh with the gear 86 against the spring tension of spring 147. This movement is transmitted to the reversing switch arm 148 on reversing switch 149 by means of the slot and pin connection 150 and at the same time switch 151 closes on contact 152 to complete the circuit of the motor 81 and operate it in reverse direction to turn the counter 132 in the case of the resetting device 108 back to zero, whereupon the blips 152 on the counter gears, when the counter registers zero, close all the switches 153 simultaneously to complete the circuit 154 and energize the solenoid 155 which operates to open switch 156, this switch being in the motor circuit stops its rotation at this point. Simultaneously with the opening of switch 156, rod 157 having the guide 158 thereon actuates lever 159 on which switch 154 is mounted to open said switch and cock the trip mechanism 143 so as to hold the switch 144 open until solenoid 142 is again energized, when the carriage or case 21 has reached the new destination at some later time. As the switch 144 is opened, the solenoid 146 is deenergized releasing gear 85 to return it to meshed position with the gear 86, returning the reversing switch 149 to forward operating position and allowing switch 151 to close on contact 160, whereby the motor circuit is completed and the motor operates in forward direction turning the counter and moving the gear assembly 87 along its spiral track on disc 88 until a predetermined value on the counter is reached as determined by the location of the contact 161 on the spiral track whereupon the gear assembly grounds the circuit through the selective switch 162 and energizes the solenoid 163 to open the switch 164 located in the motor circuit, thereby to stop the motor and counter at a desired reading. The counter being connected to the Selsyn generator 99 operates Selsyn motor 38' on slide 38 to position it at the proper point on the meridian circle 32 in accordance with the latitude of the new destination P1. As the gear 85 is returned into meshed position with the gear 86, it will be noticed that rod extension 165 on this gear operates lever 166 to advance the selective switch 162 to the next contact position whereby to break the circuit energizing solenoid 163 by the grounding of the contact 161 through gear assembly 87, so that the switch 164 is again returned to closed position to permit the motor to be operated in reverse direction again whenever the solenoid 146 is again energized to disengage the gears as a result of the carriage 21 again reaching the new destination to start another resetting operation. The switch 167 in the connection between the bearing indicator 110 and the autopilot 107 is mounted on the same axis with switches 148 and 164, there being a limited freedom of operation between switch 167 and switches 148 and 164, the arm of switch 148 having a shoulder contact with the arm of switch 167 to open the latter when 148 is moved into reverse position and the arm of switch 164 having a shoulder contact with arm 167 to close this switch when the switch 164 is opened. Thus the autopilot is disconnected from control by the bearing indicator at the beginning of the operation of the resetting device, and is again reconnected when the resetting operation has been completed. Any number of the contacts 161 may be positioned along the spiral track to determine the value to be reached on the counter of the instrument and therefore the position of the corresponding slide or other adjustment of the device to be reached during each consecutive resetting operation. For purposes of illustration, Fig. 13 shows only two of the resetting devices, connected to the slide 38 and gear 36 for resetting the latitude and longitude, respectively, of the new destination. Similar resetting devices may be adapted to operate other adjustments such as the slides 9 and 10 for resetting the declinations, and discs 4 and 4' for resetting the hour angles of new stars to be followed by the star followers, and for resetting the star followers within range of such new stars, whereby they may be readily picked up for controlling the elevation slides 18 and 19 in a manner already described.

Thus, in a broad sense, this invention includes a universal control means for directing a craft or missile automatically along any great circle route or series of connected great circle routes consecutively between predetermined geographical locations. This means may be adapted for use in the daytime as well as at night, in view of the fact that the star followers may have tube elements containing optical elements responsive to the infra-red rays from the stars, and will therefore be sensitive to these rays in broad daylight as well as at night. To show the feasibility of using such elements, reference is made to an article in the June 17, 1946, issue of "Time," entitled "Split star light," which reads:

"Astronomers heard big news: Astro-Physicist Otto Struve and his staff at the University of Chicago's Yerkes Observatory had perfected a powerful new spectrograph for photographing invisible infra-red radiations from the stars. Since the instrument can be used in broad daylight, stargazers can now go on a 24-hour shift.

"Photographing infra-red (heat) rays is not new, but Professor Struve's spectrograph is much more sensitive than any previously made. Using new red-sensitive plates developed during the war, and a gold-coated mirror (which reflects infrared rays better than a silver-plated one), the instrument can catch rays of wave-lengths twice as long as those visible to the naked eye. Its special advantage for daylight work is that, while visible light from the stars is scattered by the earth's atmosphere, the longer infra-red rays get through with relatively little interference."

In the star follower shown in Fig. 3, the tube and reflector mechanism 58, 57 may take any one of a number of different forms other than that illustrated in this figure. Several of these forms are shown in Figs. 8, 10 and 12. In Fig. 8 the tube 168 is composed of a modified Schmidt telescope or star camera and an RCA "image orthicon" photoelectric electronic tube 169. The operation of the director is as follows: Light rays entering the telescope tubes 170 pass through a Schmidt type correcting lens 171, they are focused by a spherical mirror 172 onto a reflecting mirror 173 which passes the light to another reflecting mirror 174 which in turn passes the light to a photoelectric cell mosaic 175 located in the RCA "image orthicon" tube 177. At this point the light energy is converted to electrical energy and multiplied in the same manner as in normal television for which the tube was designed. The electrical energy upon leaving the tube is passed through a small amplification circuit to a selector circuit and thence to the mechanical control circuit.

The controlling factor in this design is the size of the "image orthicon" tube which now has the dimensions of 3 inch O. D. at the large end and 2 inch O. D. on the barrel and 15 inches in length. This tube could undoubtedly be redesigned to a length of 8 to 10 inches, thereby considerably reducing the dimensions of the apparatus.

Four tubes 170 are indicated although it will be apparent that three or any number larger would be equally satisfactory. The tubes 170 are focused on the object 181 as shown in Fig. 8A. By more precise calculations a tube of smaller diameter and possibly a modified end aperture, such as semi-circular instead of circular, might be made. The length of the tube should be adjusted to the diameter so that a limited angle of rotation would provide a definite cut off.

The Schmidt type of lens is used for several reasons: It provides correction over wide angles, thereby allowing the use of a common spherical mirror in place of a more complex paraboloid type. It passes considerably more light, and finally it is believed that final tests will permit this lens to be made of plastic thus solving the manufacturing problem. The mirrors in all cases should be of the aluminum-backed type as this type provides better reflectivity especially of white light. The design of the mirrors should be such as to impinge small pencils of light on the photoelectric mosaic as shown at 176 in Fig. 8B. The size of these impingement circles does not have any particular significance so long as one spot does not merge with another. Theoretically these spots may displace slightly in accordance with any change of incident angle on the Schmidt lens, and this displacement was considered as a method of control. However, it is believed that the displacement would be so small in view of the size of the angles involved that the method would not be feasible.

The optical system as now designed is to impinge on the photoelectric mosaic 175 four light beams of approximately equal intensity. It is felt that manual adjustment should be used to bring two of the tubes 170 into line with the object. The other two would be brought into line automatically, since a balance requires that all beams have equal intensity. This principle would require the selection of stars which would not have others of similar intensity within the range of the tubes, and this is entirely feasible, as there are many. The instrument also could be calibrated so as to operate only in well defined intensity levels thereby automatically correcting for objects too bright or too dim.

A more rigid selection may be used if desired. Instead of using a mirror (174, Fig. 8) a diffraction grating (not shown) may be employed. In this use of the instrument, calibration would be made during manufacture so that a definite picture wave length would be preferred. Additional calibration could be made in the optical system by means of filters.

The electrical circuit would consist of an amplifier circuit 178 as required by the "image orthicon" tube 177 and a selector circuit 179 which would require a "balanced" picture impulse and would automatically activate the mechanical control to correct any unbalance which may appear in the picture. The entire circuit could be placed either in a space bounded by the end of the "image orthicon" tube and the outer shell, or in the spaces bounded by the telescope tubes, the "image orthicon" tube, and the outer shell. Miniature tubes and other electrical apparatus are available for this use.

The location of the supporting apparatus is not especially critical, but it is suggested that the radius of any curvature used pass through or near the center (with respect to length) of the telescope tubes, as this point would represent the maximum deflection with the least amount of travel.

The outer shell 180 should be made light tight at least to the end of the optical path to eliminate any scattered radiation, which would reduce the sensitivity of the unit. It may be necessary to shield the individual light beams by means of a cross partition at the "image orthicon" tube but this shielding can be accomplished without difficulty.

Referring to Figs. 9, 9A and 9B, in the first of these the angle of rotation is considered to be zero, as this figure represents the position of each of the tubes 170 when the director is lined up with the object by a focus as shown in Fig. 8A. In Fig. 9A, the angle of rotation is one degree in the direction shown. Complete interception occurs at approximately two degrees. In Fig. 9B, the angle of rotation is one-half degree in the opposite direction. Complete interception occurs at one-half degree because of interception at two points. The diameters of tubes 170 as shown are considerably exaggerated for clarity. Actually the preferred dimensions for a sixteen inch tube are approximately .288 inches for the small end and .750 inches for the large end. This is based on the assumption that the effective light diameter of the object is one-eighth inch. Then each tube is mounted on the director so that exact alignment of the director on the object will permit a one-eighth inch diameter beam to hit the lens in each tube. For purposes of illustration, the axis of rotation is taken as shown in Fig. 9B. The operation principle is as follows: Light rays 176 assumed to be parallel strike the lens as shown in Fig. 9 (tube position when the director is trained directly on the object). If the tube is rotated clockwise (Fig. 9A) the light continues to strike the lens and the light intensity is not affected until the angle of rotation exceeds one degree. Continued rotation will progressively decrease the intensity because interception is occurring on the one-eighth inch beam until at the angle of rotation equal to two degrees the interception is complete.

Referring back to Fig. 9 and assuming counterclockwise rotation as shown in Fig. 9B, it may be seen that any rotation will at once start ray interception at two points so that an angle of rotation equal to one-half degree will reduce the intensity to zero. Actual measurement would show a curve function rather than a straight line reduction of intensity.

In using the principle described above for the overall control, four tubes are mounted at intervals of 90 degrees about the RCA "image orthicon" tube as shown in Fig. 8. Each tube is trained on the object as in Fig. 9 so that at point of maximum focus the resultant alignment would show the object in each tube as shown in Fig. 8A. Directed in this manner a shift in any direction will reduce the amount of light striking at least one of the lenses. In the event that light reflected from the sides of the tubes 170 reduces the sensitivity, the tubes may be lined or prepared for light absorption characteristics, in order that only the direct light rays striking the lens would be transmitted.

Referring again to Fig. 8 it is seen that mirrors 172 and 173 act to collect and channel the light rays to produce the final parallel beam 176 reflected from mirror 174 to the photoelectric surface 175. Each tube 170 is expected to produce its own individual light beam on the photoelectric surface as shown in original Fig. 8B. Fig. 8B represents a sectional view taken just forward of the mirrors and looking in the direction of the "image orthicon" tube. It is at this point of the final light beam from mirror 174 to the photoelectric surface 175 (Fig. 8) that the essence of the balanced picture becomes important as this final ray for each tube represents a sum of all light entering each tube whether from the object or not. For this reason at least some precautions against reflected radiation may be necessary.

The principle of the "balanced picture" is as follows: Assume for the moment that the "image orthicon" tube were connected into a regular television hookup and receiver. When the director is in exact alignment with the object, the picture on the receiving screen would show a black field and four sources of light of the same intensity. As the director swung out of alignment, the intensity of at least one of the sources would diminish. To restore the intensity, the director would be moved so as to bring the object into the focus of all tubes. To do this automatically the "image orthicon" tube would be disconnected from the transmitter and would be connected to an electrical circuit capable of "analyzing" the impulse from the tube. Since four equal intensity beams impinging upon the photoelectric surface will give a definite type of signal from the tube, a circuit capable of controlling mechanism to change from an "unbalanced" signal to a "balanced" condition is not difficult. As suggested the intensity control feature would be built into this same circuit.

Essentially two features are apparent: The original manual adjustment must come within ± one degree of the direction of the source of the beam in any direction; and secondly, the final accuracy of the instrument depends on an electronic control. By using this type control the sensitivity level may be raised to meet easily the limits of any final accuracy desired.

The tube dimensions and angle calculations are approximate in the sense that final calculations depend entirely on the axis of rotation of the director, and the figures above are given as indicative values in order to explain the principles involved. Since this control is really a mechanical light cut-off the problem is one of aligning the four tubes to obtain a maximum light quantity change with a minimum of deflection. The analyzing circuit should be sensitive enough to operate on changes in the order of 5-10 per cent. Greater sensitivity could be obtained but it is felt that secondary stars within the effective radius (calc±1°) might cause an error. Should less than five per cent sensitivity be required, it would be possible to design a movable opaque slide which would be inserted in the tube directly in front of the lens in such a manner as to reduce the effective rotational angle from two degrees to one degree. The control mechanism for these slides would be actuated at a predetermined balance level of the four beams, i. e., the energy level of all beams as recorded by the "image orthicon" signal being within a spread of twenty-five per cent.

It is felt that definite energy control levels must be incorporated if the instrument is to be "foolproof" with respect to interception, accidental or intentional, by sun, moon, or high altitude long burning flares. This cutoff may be provided for by a direct connection from the signal analyzer circuit (and in this case energy level control circuit) to the control system outlined in the description of the resetting device of Figs. 6 and 6A.

Another form of tube that may be used in the star follower is shown in Figs. 10 and 12.

This form is adaptable for use with either the "image orthicon" tube (Fig. 12) or Geiger counters (Fig. 10) with equal facility.

In the preceding follower tubes, the telescope tubes are accurately preset to provide optimum cutoff limits. In the form shown in Fig. 10, the control centers on the movement of a single telescope tube 182, and a reflecting pyramid 183 mounted in the base 184 of the telescope tube 185.

The principles of construction and operation are as follows: A small telescope tube 182 of such dimensions as to provide individual star sighting is mounted directly in front of a small reflecting pyramid 183. In the design shown, the pyramid apex included angle is one hundred twenty degrees. This determines the angle of incidence and reflection at sixty degrees. These angles are not critical in size so long as the light wave length and the laws of reflection and refraction are observed, and the angles may be varied to meet the assembly requirements of the director. In this design the center of rotation is preferably located on the vertical centerline of the pyramid at a point in back of the apex as at 186. By selecting a center point at the proper distance from the apex, rotation of one-half degree may be made to cause complete blackout of light on one surface (rotation in one plane).

If the use of Geiger counters is desired, a counter 187 equipped with special quartz glass windows 189 is positioned so that the rays of light 188 from any one side of the pyramid will strike the window 189 in the corresponding counter 187. Three other Geiger counters 187 are placed in similar positions on the other sides of the pyramid 183. The counters are connected to electronic circuits which measure the change in counting rates and activate the control mechanisms to provide a balanced discharge rate among the counters in a manner already described. A dummy counter of similar design but shielded from any light rays is incorporated into the circuit controlling each pair of Geiger counters to provide a reference point upon which the difference noted in the electronic control circuit is based. In this manner instantaneous calibration is provided should the director be subjected to varying conditions of ionization in the environment, e. g., a variation in the intensity of cosmic rays occasioned by a change in altitude.

The use of Geiger counters is dependent upon the fact that a Geiger counter equipped with a quartz window is very sensitive to ultraviolet light and will show drastic increases in ionization rates when subjected to ultraviolet rays of low intensity such as those rays emitted by a burning match. It is probable that the Geiger counters would react to provide a measurable difference without the use of lenses in the telescope tube. However, it is felt that ground quartz lens used in a regular telescope tube would improve considerably the sensitivity. Stars vary considerably in the amount of ultraviolet light emitted, with the double stars emitting the highest quanta.

It is readily apparent that four "image orthicon" tubes could be used in place of the four Geiger counters. Nevertheless, the use of the pyramid splits the light beam into quarters (in essence) and it is felt that at least a low-power telescope combination of lenses must be used in order to reach the light energy level required by the "image orthicon" tube. This move toward a low power telescope is justifiable because the following simplification may be made: A low power telescope designed to raise the energy level of each quarter of light beam into the range of the "image orthicon" tube is inserted into the system. However, instead of placing an "image orthicon" tube at each side of the pyramid, an additional mirror 190 (or mirrors) is used as shown in Fig. 12. Each system of mirrors (for each side of the pyramid) is designed so that the light 188 from that side of the pyramid impinges upon a definite section of a single "image orthicon" tube 177 (same as in Fig. 8). The "image orthicon" tube requires the same "balanced picture" previously referred to and has the same operating controls and conditions. In the interest of space the "image orthicon" tube may be mounted beside the telescope tube.

In the matter of locating the object when using the pyramid reflector, the original manual adjustment should bring into the field at least two sides of the pyramid, and automatic control would then center the object on the apex.

In summarizing, essentially four modifications are readily apparent. They are:

1. Four telescopic tubes and one "image orthicon" tube.
2. Four telescopic tubes and four Geiger counters (a fifth necessary for instantaneous calibration).
3. One telescopic tube and pyramid reflector and four Geiger counters (a fifth required as in No. 2).
4. One telescopic tube and pyramid reflector and one "image orthicon" tube.

In the composite navigation director, the choice of star follower, whether it be a Geiger counter type or "orthicon" tube type, and its specific form, is a matter of design and does not affect the director combination as a whole. For universal use in broad daylight as well as at night, however, a form of tube including elements sensitive to the invisible infra-red rays which comprise more than half of the radiation from most stars would be preferable.

Obvious modifications in the form of the various parts and arrangement of the several elements therein may be made without departing from the spirit and scope of this invention.

The invention described herein may be manufactured and used by or for the Government of the United States of America for governmental purposes without the payment of any royalties thereon or therefor.

What is claimed is:

1. A navigational director for a high speed aircraft or missile comprising: a pair of star followers for automatically and continuously measuring the true altitude and relative bearing of each of two stars; a computer responsive to these altitude measurements to determine the instant geographical position of the director when the proper values of the celestial locations of the two stars have been entered; indicators operated by the computer for indicating continuously the instantaneous longitude and latitude of the director's geographical position and its true heading and heading relative to each of said star azimuths as well as the bearing of a desired course; and a controller for said craft or missile operated in response to said bearing and heading indicators to maintain the true heading on said course.

2. A navigational director for a high speed aircraft or missile comprising: a pair of star followers responsive to infra-red rays from any star within approximately a ten degree range of a manual preadjustment, for automatically and continuously measuring the true altitude and relative bearing of each of two stars; a computer responsive to these altitude measurements to determine the instant geographical position of the director when the proper values of the celestial locations of the two stars have been entered; indicators operated by the computer for indicating continuously the instantaneous longitude and latitude of the director's geographical position and its true heading and heading relative to each of said star azimuths as well as the bearing of a desired course; and a controller for said craft or missile operated in response to said bearing and heading indicators to maintain the true heading on said course.

3. A navigational director for a high speed aircraft or missile comprising: a pair of star followers equipped with an "image orthicon" and responsive to rays from any star within approximately a ten degree range of a manual preadjustment, for automatically and continuously measuring the true altitude and relative bearing of each of two stars; a computer responsive to these altitude measurements to determine the instant geographical position of the director when the proper values of the celestial locations of the two stars have been entered; indicators operated by the computer for indicating continuously the instantaneous longitude and latitude of the director's geographical position and its true heading and heading relative to each of said star azimuths as well as the bearing of a desired course; and a controller for said craft or missile operated in response to said bearing and heading indicators to maintain the true heading on said course.

4. A navigational director for a high speed aircraft or missile comprising: a pair of star followers equipped with Geiger counters and responsive to rays from any star within approximately a ten degree range of a manual preadjustment, for automatically and continuously measuring the true altitude and relative bearing of each of two stars; a computer responsive to these altitude measurements to determine the instant geographical position of the director when the proper values of the celestial locations of the two stars have been entered; indicators operated by the computer for indicating continuously the instantaneous longitude and latitude of the director's geographical position and its true heading and heading relative to each of said star azimuths as well as the bearing of a desired course; and a controller for said aircraft or missile operated in response to said bearing and heading indicators to maintain the true heading on said course.

5. A navigational director for a high speed aircraft or missile comprising: a pair of star followers selectively responsive to rays from any star of a specified intensity, within approximately a ten degree range of a manual preadjustment, for automatically and continuously measuring the true altitude and relative bearing of each of two stars; a computer responsive to these altitude measurements to determine the instant geographical position of the director when the proper values of the celestial locations of the two stars have been entered; indicators operated by the computer for indicating continuously the instantaneous longitude and latitude of the director's geographical position and its true heading and heading relative to each of said star azimuths as well as the bearing of a desired course; and a controller for said aircraft or missile operated in response to said bearing and heading indicators to maintain the true heading on said course.

6. A navigational director for a high speed aircraft or missile comprising: a pair of star followers for automatically and continuously measuring the true altitude and relative bearing of each of two stars; a computer responsive to these altitude measurements to determine the instant geographic position of the director when the proper values of the celestial locations of the two stars have been entered, said computer including means for determining the course and distance to any other geographical position over a great circle route; indicators operated by the computer for indicating continuously the instantaneous longitude and latitude of the director's geographical position and its true heading and heading relative to each of said star azimuths as well as the bearing of a desired course; and a controller for said aircraft or missile operated in response to said bearing and heading indicators to maintain the true heading on said course.

7. A navigational director for a high speed aircraft or missile comprising: a pair of star followers for automatically and continuously measuring the true altitude and relative bearing of each of two stars; a computer responsive to these altitude measurements to determine the instant geographical position of the director when the proper values of the celestial locations of the two stars have been entered, said computer including means for determining the course and distance to any other geographical position over a great circle route; indicators operated by the computer for indicating continuously the instantaneous longitude and latitude of the director's geographical position and its true heading and heading relative to each of said star azimuths as well as the bearing and distance to said other geographical position; a controller for said aircraft or missile operated in response to said bearing and heading indicators to maintain the true heading on said course; and resetting devices responsive to the movement of the director into a predetermined position for shifting one or both of said star followers to new stars.

8. A navigational director for a high speed aircraft or missile comprising: a pair of star followers for automatically and continuously measuring the true altitude and relative bearing of each of two stars; a computer responsive to these altitude measurements to determine the instant geographical position of the director when the proper values of the celestial locations of the two stars have been entered, said computer including means for determining the course and distance to any other geographical position over a great circle route; indicators operated by the computer for indicating continuously the instantaneous longitude and latitude of the director's geographical position and its true heading and heading relative to each of said star azimuths as well as the bearing and distance to said other geographical position; a controller for said aircraft or missile operated in response to said bearing and heading indicators to maintain the true heading on said course; and resetting devices responsive to the movement of the director to a predetermined position along its course to reset any of the controlling elements.

9. A navigational director for a high speed aircraft or missile comprising: a pair of star followers for automatically and continuously measuring the true altitude and relative bearing of each of two stars; a computer responsive to these altitude measurements to determine the instant geographical position of the director when the proper values of the celestial locations of the two stars have been entered, said computer including means for determining the course and distance to any other geographical position over a great circle route; indicators operated by the computer for indicating continuously the instantaneous longitude and latitude of the director's geographical position and its true heading and heading relative to each of said star azimuths as well as the bearing and distance to said other geographical position; a controller for said aircraft or missile operated in response to said bearing and heading indicators to maintain the true heading on said course; and resetting devices for changing any of the controlling elements to provide a continuous control of said craft or missile along a series of courses along predetermined great circle routes consecutively through any number of geographical positions.

10. In a navigational director for a high speed aircraft or missile, a star follower for automatically and continuously measuring the true altitude and relative bearing of a star comprising: a star follower tube mounted for adjustment in elevation on a base rotatable about a stabilized vertical axis, said base having means for damping its movements about said axis; light sensitive means in said tube responsive to alignment of said tube on said star; reversible motors for moving said tube to vary its elevation and to adjust said base about the vertical axis; control means for said motors responsive to said light sensitive means for maintaining aid tube aligned with said star; indicator means for indicating the true altitude and relative bearing of said star with respect to the course of said craft or missile operated in accordance with the elevation of said tube and the position of said base about said vertical axis.

11. In a navigational director for a high speed aircraft or missile, a star follower for automatically and continuously measuring the true altitude and relative bearing of a star comprising: a star follower tube mounted for adjustment in elevation on a base rotatable about a gyro-stabilized vertical axis, said base having means for damping its movements about said axis; means sensitive to the infra-red rays in said tube responsive to alignment of said tube on said star; reversible motors for moving said tube to vary its elevation and to adjust said base about the vertical axis; control means for said motors responsive to said ray sensitive means for maintaining said tube aligned with said star; indicator means for indicating the true altitude and relative bearing of said star with respect to the course of said craft or missile operated in accordance with the elevation of said tube and the position of said base about said vertical axis.

12. In a navigational director for a high speed aircraft or missile, a star follower for automatically and continuously measuring the true altitude and relative bearing of a star comprising:

a star follower tube mounted for adjustment in elevation on a base rotatable about a gyro-stabilized vertical axis, said base having means for damping its movements about said axis; means sensitive to rays from said star including Geiger counters responsive to alignment of said tube on said star; reversible motors for moving said tube to vary its elevation and to adjust said base about the vertical axis; control means for said motors responsive to said ray sensitive means for maintaining said tube aligned with said star; indicator means for indicating the true altitude and relative bearing of said star with respect to the course of said craft or missile operated in accordance with the elevation of said tube and the adjustment of said base about said vertical axis.

13. In a navigational director for a high speed aircraft or missile, a star follower such as defined in the claim 12 having correcting means for said elevation indicator comprising: a rotatable corrector device; an adjustment between the vertical axis of said follower and the indicator mounting operated in response to the speed of operation of the corrector device; a disc connected to said device; a second disc at right angles to said first disc, frictionally connected thereto and normally having its axis in line with said first disc; a third disc rotatably mounted at right angles to said second disc, having its axis in a line with said second disc, said third disc being turned at a speed proportional to the speed of travel of said director, its axis being adjustable out of alignment with said second disc in a direction and accordance with the value of the instantaneous N or S latitude of said director, said first disc being displaceable off the axis of the second disc in a direction and in accordance with the relative bearing between the director's course and the star azimuth, whereby the correction of the elevation indication will compensate for the effects on the altitude observation due to Coriolis acceleration.

14. In a navigational director for a high speed aircraft or missile, a star follower for automatically and continuously measuring the true altitude and relative bearing of a star comprising: a star follower tube mounted for adjustment in elevation on a base rotatable about a gyro-stabilized vertical axis, said base having means for damping its movements about said axis; means sensitive to rays from said star including an "image orthicon" electronic tube; reversible motors for moving said tube to vary its elevation and to adjust said base about the vertical axis; control means for said motors responsive to said sensitive means for maintaining said tube aligned with said star; indicator means for indicating the true altitude and relative bearing of said star with respect to the course of said craft or missile operated in accordance with the elevation of said tube and the adjustment of said base about said vertical axis.

15. In a navigational director for a high speed aircraft or missile, a computer for continuously determining the instantaneous geographical position of said director comprising: a pair of circular supports pivotally mounted on a common vertical diametric axis and having means for adjusting their angular positions about said axis; a slide adjustably mounted on each of said circular supports; a pair of quadri-circular supports pivotally joined at one end to each other and having adjustable slides thereon pivotally connected to the slides on said circular supports respectively, all of said supports being mounted concentrically about a common center; a third circular support mounted concentrically on said vertical axis for rotation about said vertical axis, and having a slide thereon supporting the common pivot of said quadri-circular supports on a radial axis; and indicator means for indicating the angular distances of the slides on said circular supports from points midway between the vertical axis, also the complementary angles of the angular distances of the slides on the quadri-circular supports from their common pivot, as well as the angular values to which the circular supports are adjusted relative to a reference direction and the angles made by the quadri-circular supports with respect to the circular support supporting their common pivot.

16. In a navigational director for a high speed aircraft or missile, a computer for continuously determining the instantaneous geographical position of said director comprising: a pair of circular supports pivotally mounted on a common vertical diametric axis and having means for adjusting their angular positions about said axis; a slide adjustably mounted on each of said circular supports; a pair of quadri-circular supports pivotally joined at one end to each other and having adjustable slides thereon pivotally connected to the slides on said circular supports respectively, all of said supports being mounted concentrically about a common center; a third circular support mounted concentrically on said vertical axis for rotation about said vertical axis, and having a slide thereon supporting the common pivot of said quadri-circular supports on a radial axis; indicator means for indicating the angular distances of the slides on said circular supports from points midway between the vertical axis, also the complementary angles of the angular distances of the slides on the quadri-circular supports from their common pivot, as well as the angular values to which the circular supports are adjusted relative to a reference direction and the angles made by the quadri-circular supports with respect to the circular support supporting their common pivot; said indicator means being remote from said computer and controlled by Selsyn motors connected to Selsyn generators at the respective points of measurement.

17. In a navigational director for a high speed aircraft or missile, a computer for continuously determining the instantaneous geographical position of said director comprising: a pair of circular supports pivotally mounted on a common vertical diametric axis and having means for adjusting their angular positions about said axis; a slide adjustably mounted on each of said circular supports; a pair of quadri-circular supports pivotally joined at one end to each other and having adjustable slides thereon pivotally connected to the slides on said circular supports respectively, all of said supports being mounted concentrically about a common center; a third circular support mounted concentrically on said vertical axis for rotation about said vertical axis, and having a slide thereon supporting the common pivot of said quadri-circular supports on a radial axis; indicator means for indicating the angular distances of the slides on said circular supports from points midway between the vertical axis, also the complementary angles of the angular distances of the slides on the quadri-circular supports from their common pivot, as well as the angular values to which the circular supports are adjusted relative to a reference direction and the angles made by the quadri-circular supports with respect to the circular support supporting their common pivot; a fourth circular support concentrically mounted about said common center for adjustment about said vertical axis, and having a slide adjustably mounted thereon; a cage pivotally mounted about the common pivot of said quadri-circular supports; a semi-circular support pivotally connected at one end to said last-named slide and having its other end slidably passed through said cage; and means for indicating the angular position of said last-named slide on its circular support from a point midway between the vertical axis, and indicator means for indicating the circular distance of the pivot of said slide to the common pivot of said quadri-circular support, as well as the angle between said semi-circular support and said third circular support.

18. In a navigational director for a high speed aircraft or missile, a resetting device having automatic control means connected electrically to an autopilot through a switch comprising: a reversible motor connected to a counter indicator and geared through a clutch mechanism to a cam plate, one or more contacts on said cam plate for operation by a cam follower on said cam plate, said cam follower being grounded; a selective switch; connections between said contacts and the several terminals of said selective switch; means for advancing said switch in response to the operation of said clutch; a starting switch for initiating the cycle of operations of said resetting device; a Selsyn unit connected to said motor and responsive to the operation of some indicating means in said director; a solenoid operated by said starting switch; a solenoid for disengaging said clutch operated by a switch having a trip mechanism for holding it open, said trip mechanism being actuated by said first solenoid to close the switch and thus release the clutch; a reverse switch on said motor and a switch in the operating circuit of said motor actuated by the movement of said clutch into release position to start the motor in reverse direction; another switch in the motor circuit; and a solenoid for opening said switch, said last-named solenoid being energized in response to the return of the counter indicator to a zero value, thus stopping the motor; means on said last-named switch for opening the clutch solenoid switch into its tripped position, the return of the clutch into engagement advancing the selective switch to the next contact position bringing the reversing switch into forward position and closing the motor circuit for forward operation through a by-pass around the other motor circuit switch; a third motor circuit switch normally closed; a solenoid for opening said third switch in response to current passed through the selective switch and the corresponding contact on the cam plate; and means operated by movement of said reversing switch to open the auto-pilot control switch; and means operated in response to the opening of said third switch to close said autopilot control switch.

ROBERT E. JASPERSON.